US010687186B1

(12) United States Patent
Ju et al.

(10) Patent No.: US 10,687,186 B1
(45) Date of Patent: Jun. 16, 2020

(54) SYSTEM AND METHOD FOR DECODING OVERLAPPING WIRELESS FRAMES

(71) Applicant: GM GLOBAL TECHNOLOGY OPERATIONS LLC, Detroit, MI (US)

(72) Inventors: Xi Ju, Troy, MI (US); Timothy J. Talty, Beverly Hills, MI (US); Dan Shan, Troy, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/564,417

(22) Filed: Sep. 9, 2019

(51) Int. Cl.
| | |
|---|---|
| *H04L 27/06* | (2006.01) |
| *H04W 4/48* | (2018.01) |
| *H04W 4/12* | (2009.01) |
| *H04L 25/02* | (2006.01) |
| *H04L 1/00* | (2006.01) |
| *H04W 84/18* | (2009.01) |

(52) U.S. Cl.
CPC .............. *H04W 4/48* (2018.02); *H04L 1/0054* (2013.01); *H04L 25/0212* (2013.01); *H04W 4/12* (2013.01); *H04W 84/18* (2013.01)

(58) Field of Classification Search
CPC ....... H04L 1/0054; H04L 5/14; H04L 1/1825; H03M 13/41; H04B 1/7163; H04B 7/0413

USPC .......................................................... 375/341
See application file for complete search history.

(56) References Cited

U.S. PATENT DOCUMENTS

| | | | |
|---|---|---|---|
| 2020/0008224 A1* | 1/2020 | Ozturk | H04W 72/046 |
| 2020/0067565 A1* | 2/2020 | Yu | H04B 1/7103 |

* cited by examiner

*Primary Examiner* — Khai Tran
(74) *Attorney, Agent, or Firm* — Lorenz & Kopf LLP

(57) ABSTRACT

A processor-implemented method by a message recipient in a vehicle or on a mobile device for decoding overlapping wireless messages is provided. The method comprises: receiving a first message from a first message sender that overlaps with a second message received from a second message sender; estimating, in a first signal recovery phase, a received data symbol ($d_0$) from the first message and a channel impulse response ($h_1$) corresponding to a data channel between the message recipient and the second message sender; estimating, in a second signal recovery phase, a received data symbol ($d_0$)' from the first message and a received data symbol ($d_1$) from the second message; and reconstructing the first message from the estimated data symbol ($d_0$) estimated in the first signal recovery phase and estimated data symbol ($d_0$)' estimated during the second signal recovery phase and reconstructing the second message from the estimated data symbol ($d_1$) estimated during the second signal recovery phase.

17 Claims, 3 Drawing Sheets

SYSTEM AND METHOD FOR DECODING OVERLAPPING WIRELESS FRAMES

TECHNICAL FIELD

The present disclosure relates generally to system and methods for wireless communication and more particularly to system and methods for decoding overlapping data frames in wireless systems.

In some wireless networks, transmissions from different sources are not scheduled well resulting in messages from different sources overlapping in time (called: message collision). Packet collisions are common in vehicular ad hoc networks where adjacent OBUs (on-board units) use the same frequency band, as in the case with C-V2X (cellular-V2X) systems. When two messages overlap with each other, at least one may be damaged and difficult to recover.

Accordingly, it is desirable to provide systems and methods for decoupling overlapping frames to decode both, with low computational complexity. Furthermore, other desirable features and characteristics of the present invention will become apparent from the subsequent detailed description of the invention and the appended claims, taken in conjunction with the accompanying drawings and the background of the invention.

SUMMARY

Systems and methods are provided for decoding overlapping wireless messages. In one embodiment, a processor-implemented method by a message recipient in a vehicle or on a mobile device for decoding overlapping wireless messages is provided. The method includes: receiving a first message from a first message sender that overlaps with a second message received from a second message sender; estimating, in a first signal recovery phase, a received data symbol ($d_0$) from the first message and a channel impulse response ($h_1$) corresponding to a data channel between the message recipient and the second message sender; estimating, in a second signal recovery phase, a received data symbol ($d_0$)' from the first message and a received data symbol ($d_1$) from the second message; and reconstructing the first message from the estimated data symbol ($d_0$) estimated in the first signal recovery phase and data symbol ($d_0$)' estimated during the second signal recovery phase and reconstructing the second message from the estimated data symbol ($d_1$) estimated during the second signal recovery phase.

In one embodiment, the estimating, in a first signal recovery phase, a received data symbol ($d_0$) from the first message and a channel impulse response ($h_1$) corresponding to the data channel between the message recipient and the second message sender includes using maximum-likelihood decoding to estimate, in a first signal recovery phase, a received data symbol ($d_0$) from the first message and a channel impulse response ($h_1$) corresponding to the data channel between the message recipient and the second message sender.

In one embodiment, the estimating in the first signal recovery phase includes assuming the changes of channel impulse response ($h_1$) in both time-domain and frequency-domain as being minimal, and includes estimating a received data symbol ($d_0$) and a channel impulse response ($h_1$) simultaneously with this assumption.

In one embodiment, the estimating in the second signal recovery phase includes using the estimated value for the channel impulse response ($h_1$) corresponding to a data channel between the message recipient and the second message sender determined in the first signal recovery phase and estimating a received data symbol ($d_0$)' from the first message and a received data symbol ($d_1$) from the second message.

In one embodiment, the estimating in the second signal recovery phase includes assuming a value for a channel impulse response ($h_0$) corresponding to a data channel between the message recipient and the first message sender, using the estimated value for the channel impulse response ($h_1$) corresponding to a data channel between the message recipient and the second message sender determined in the first signal recovery phase and estimating a received data symbol ($d_0$)' from the first message and a received data symbol ($d_1$) from the second message.

In one embodiment, the estimating in the first signal recovery phase and the estimating in the second signal recovery phase are performed by a controller configured by programming instructions on non-transient computer readable media at the message recipient.

In another embodiment, a controller for a message recipient in a vehicle or on a mobile device for decoding overlapping wireless messages is provided. The controller is configured to: receive a first message from a first message sender that overlaps with a second message received from a second message sender; estimate, in a first signal recovery phase, a received data symbol ($d_0$) from the first message and a channel impulse response ($h_1$) corresponding to a data channel between the message recipient and the second message sender; estimate, in a second signal recovery phase, the received data symbol ($d_0$)' from the first message and a received data symbol ($d_1$) from the second message; and reconstruct the first message from the estimated data symbol ($d_0$) estimated in the first signal recovery phase and a data symbol ($d_0$)' estimated during the second signal recovery phase and reconstruct the second message from the estimated data symbol ($d_1$) estimated during the second signal recovery phase.

In one embodiment, to estimate, in a first signal recovery phase, a received data symbol ($d_0$) from the first message and a channel impulse response ($h_1$) corresponding to the data channel between the message recipient and the second message sender the controller may be configured to implement maximum-likelihood decoding to estimate, in a first signal recovery phase, a received data symbol ($d_0$) from the first message and a channel impulse response ($h_1$) corresponding to the data channel between the message recipient and the second message sender.

In one embodiment, to estimate, in a first signal recovery phase, the controller may be configured to assume the changes of channel impulse response ($h_1$) in both time-domain and frequency-domain as being minimal and estimate a received data symbol ($d_0$) and a channel impulse response ($h_1$) simultaneously with this assumption.

In one embodiment, to estimate in the second signal recovery phase the controller may be configured to use the estimated value for the channel impulse response ($h_1$) corresponding to a data channel between the message recipient and the second message sender determined in the first signal recovery phase and estimate a received data symbol ($d_0$)' from the first message and a received data symbol ($d_1$) from the second message.

In one embodiment, to estimate in the second signal recovery phase the controller may be configured to use a known value for the channel impulse response ($h_0$) corresponding to a data channel between the message recipient and the first message sender, use the estimated value for the data channel impulse response ($h_1$) corresponding to a data channel between the message recipient and the second message sender determined in the first signal recovery phase and estimate a received data symbol ($d_0$)' from the first message and a received data symbol ($d_1$) from the second message.

In another embodiment, a non-transitory computer readable storage medium embodying programming instruction and hardware configurations for performing a method by a message recipient in a vehicle or on a mobile device is provided. The method includes: receiving a first message from a first message sender that overlaps with a second message received from a second message sender; estimating, in a first signal recovery phase, a received data symbol ($d_0$) from the first message and a channel impulse response ($h_1$) corresponding to a data channel between the message recipient and the second message sender; estimating, in a second signal recovery phase, a received data symbol ($d_0$)' from the first message and a received data symbol ($d_1$) from the second message; and reconstructing the first message from the estimated data symbol ($d_0$) estimated during the first signal recovery phase and estimated data symbol ($d_0$)' estimated during the second signal recovery phase and reconstructing the second message from the estimated data symbol ($d_1$) estimated during the second signal recovery phase.

In one embodiment, the estimating, in a first signal recovery phase, a received data symbol ($d_0$) from the first message and a channel impulse response ($h_1$) corresponding to the data channel between the message recipient and the second message sender includes using maximum-likelihood decoding to estimate, in a first signal recovery phase, a received data symbol ($d_0$) from the first message and a channel impulse response ($h_1$) corresponding to the data channel between the message recipient and the second message sender.

In one embodiment, the estimating in the first signal recovery phase includes using a known value for a channel impulse response ($h_0$) corresponding to a data channel between the message recipient and the first message sender and estimating a received data symbol ($d_0$) from the first message and a channel impulse response ($h_1$) corresponding to a data channel between the message recipient and the second message sender.

In one embodiment, the estimating in the second signal recovery phase includes using the estimated value for the channel impulse response ($h_1$) corresponding to a data channel between the message recipient and the second message sender determined in the first signal recovery phase and estimating a received data symbol ($d_0$)' from the first message and a received data symbol ($d_1$) from the second message.

In one embodiment, the estimating in the second signal recovery phase includes using a known value for a channel impulse response ($h_0$) corresponding to a data channel between the message recipient and the first message sender, using the estimated value for the channel impulse response ($h_1$) corresponding to a data channel between the message recipient and the second message sender determined in the first signal recovery phase and estimating a received data symbol ($d_0$)' from the first message and a received data symbol ($d_1$) from the second message.

In one embodiment, the estimating in the first signal recovery phase and the estimating in the second signal recovery phase are performed by a controller configured by programming instructions on non-transient computer readable media at the message recipient.

BRIEF DESCRIPTION OF THE DRAWINGS

Aspects of the present disclosure are best understood from the following detailed description when read with the accompanying figures, wherein like numerals denote like elements.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, mobile communication, vehicle-to-vehicle communication, orthogonal frequency-division multiplexing (OFDM), and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The described systems, methods, apparatus, and techniques disclose a new method to detect and decode two overlapped frames. The described systems, methods, apparatus, and techniques can provide a novel method to process two consecutive, overlapped OFDM packets from different sources, and separate them by predefined estimation to reduce on-board processing burden.

Figure 1:
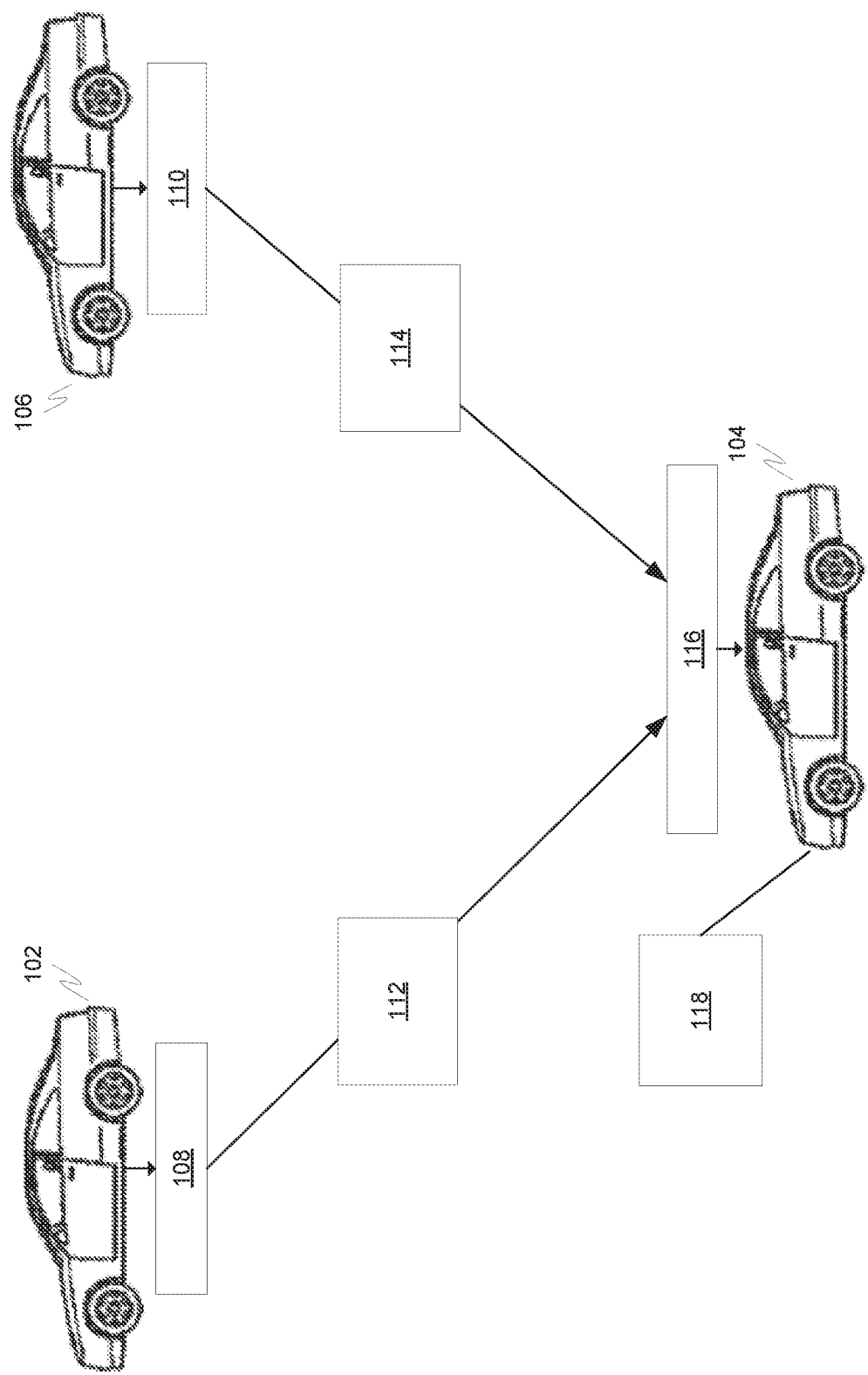
FIG. 1 is a block diagram depicting an example operating scenario in an example mobile environment in which a first message sending vehicle communicates with a message recipient vehicle and a second message sending vehicle communicates with the message recipient vehicle, in accordance with some embodiments.

FIG. 1 is a block diagram depicting an example operating scenario in an example mobile environment in which a first message sending vehicle 102 communicates with a message recipient vehicle 104 and a second message sending vehicle 106 communicates with the message recipient vehicle 104. The communication between the first message sending vehicle 102 and the message recipient vehicle 104, and the communication between the second message sending vehicle 106 and the message recipient vehicle 104 are made using an orthogonal frequency-division multiplexing (OFDM) system, such as WiFi, C-V2X (cellular V2X), or LTE (Long-Term Evolution). In this example, the first vehicle 102 sends a first message 108 with two data symbols designated $d_0$ and $d_0'$ and the second vehicle 106 sends a second message 110 with two data symbols designated $d_1'$ and $d_1''$. The communication channel through which the first message 108 is sent has an impulse response 112 designated $h_0(t)$. The communication channel through which the second message 110 is sent has an impulse response 114 designated $h_1(t)$. The second vehicle receives a message 116 that is somewhat different from either of the first message 108 or the second message 110, but from which the data symbols in the first message 108 and the second message 110 can be recovered.

In this example, the first message 108 and second message 110 overlap, and the received message 116 (designated $r^i$) is equal to the transmitted message symbol $d^i_0$ convolved with the channel impulse response $h_0^i$ plus the transmitted message symbol $d^i_0{'}$ convolved with the channel impulse response $h_0^i$ plus the transmitted message symbol $d^i_1{'}$ convolved with the channel impulse response $h_1^i$ plus the transmitted message symbol $d^i_1{''}$ convolved with the channel impulse response $h_1^i$ plus noise (designated $n^i$): $r^i = (d^i_0 * h^i_0) + (d^i_0{'} * h^i_0) + (d^i_1{'} * h^i_1) + (d^i_1{''} * h^i_1) + n^i$ In particular, the i-th subcarrier at one time instance in an OFDM system can be modelled as follows: $r^i = d^i_0 * h^i_0 + d^i_1 * h^i_1 + n^i$ where $r^i$ is the received symbol at the i-th subcarrier; $d^i_0$ is the transmitted (data or pilot) symbol from the first message sender 102 at the i-th subcarrier; "*" represents a convolution operation; $h^i_0$ is the channel response at the i-th subcarrier for the channel between the first message sender 102 and the message recipient 104; $d^i_1$ is the transmitted (data or pilot) symbol from the second message sender 106 at the i-th subcarrier; $h^i_1$ is the channel response at the i-th subcarrier for the channel between the second message sender 106 and the message recipient 104; and $n^i$ represents the noise at the i-th subcarrier.

The message recipient vehicle 104 includes an overlapping message decoder 118 that is configured to decode the data symbols $d^i_0$ and $d^i_0{'}$ in the first message 108 and the data symbols $d^i_1{'}$ and $d^i_1{''}$ in the second message 110. The overlapping message decoder 118 is configured to decode the data symbols $d^i_0$ in the first message 108 and the data symbols $d^i_1$ in the second message 110 when the first message 108 and the second message 110 overlap. In the example, of FIG. 1, data symbol $d^i_0{'}$ from the first message 108 overlaps with data symbol $d^i_1{'}$ from the second message 110.

Figure 2:
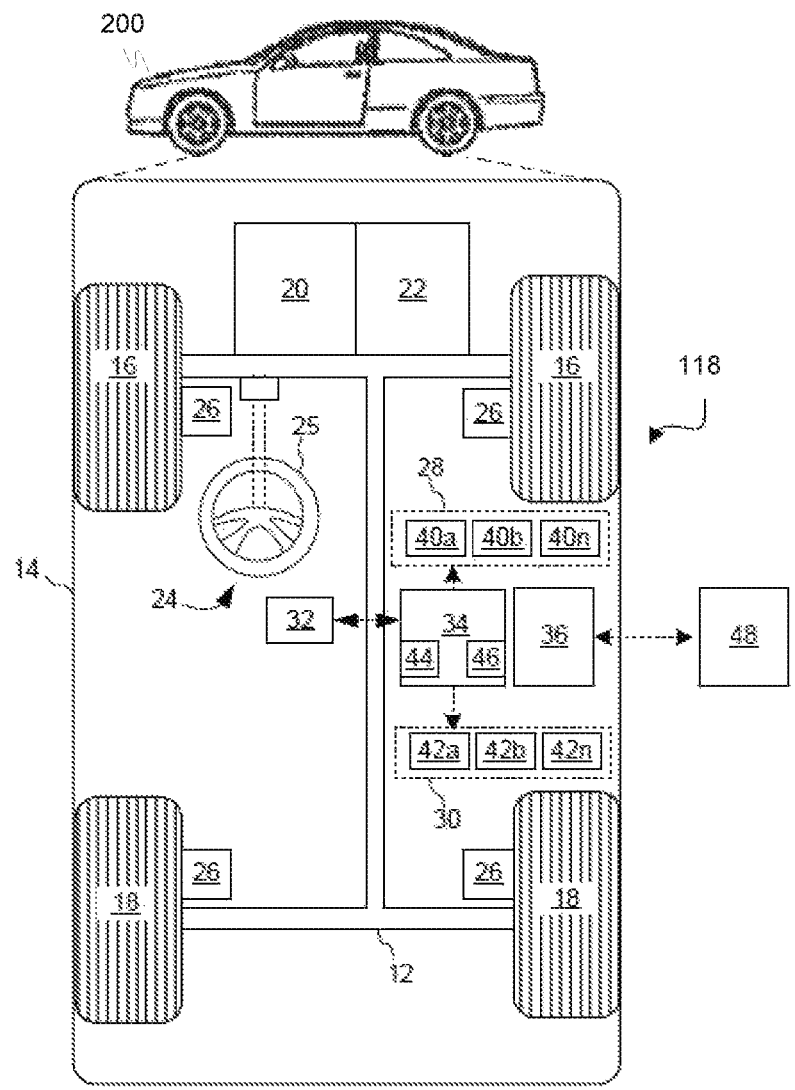
FIG. 2 is a block diagram of an example vehicle that can implement an overlapping message decoder, in accordance with some embodiments.

FIG. 2 is a block diagram of an example vehicle 200 that can implement an overlapping message decoder 118. The vehicle 200 generally includes a chassis 12, a body 14, front wheels 16, and rear wheels 18. The body 14 is arranged on the chassis 12 and substantially encloses components of the vehicle 200. The body 14 and the chassis 12 may jointly form a frame. The wheels 16-18 are each rotationally coupled to the chassis 12 near a respective corner of the body 14. The vehicle 200 is depicted in the illustrated embodiment as a passenger car, but other vehicle types, including motorcycles, trucks, sport utility vehicles (SUVs), recreational vehicles (RVs), marine vessels, aircraft, etc., may also be used. The vehicle 200 may be capable of being driven manually, autonomously and/or semi-autonomously.

The vehicle 200 further includes a propulsion system 20, a transmission system 22, a steering system 24, a brake system 26, a sensor system 28, an actuator system 30, at least one data storage device 32, at least one controller 34, and a communication system 36 that is configured to wirelessly communicate information to and from other entities 48.

The data storage device 32 stores data for use in automatically controlling the vehicle 200. The data storage device 32 may be part of the controller 34, separate from the controller 34, or part of the controller 34 and part of a separate system. The controller 34 includes at least one processor 44 and a computer-readable storage device or media 46. In various embodiments, controller 34 implements an enhancement controller 103 for predicting transfer-of-control events and determining mitigating and/or enhancement actions for mitigating/enhancing the likelihood of the predicted transfer-of-control event occurring. Although only one controller 34 is shown in FIG. 2, embodiments of the vehicle 200 may include any number of controllers 34 that communicate over any suitable communication medium or a combination of communication mediums and that cooperate to process the sensor signals, perform logic, calculations, methods, and/or algorithms, and generate control signals to automatically control features of the vehicle 200. The controller 34, in this example, is configured to implement the overlapping message decoder 118.

The controller 34 includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and non-volatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller. The programming instructions may include one or more separate programs, each of which comprises an ordered listing of executable instructions for implementing logical functions.

Referring back to FIG. 1, the overlapping message decoder 118 is configured to estimate the values of overlapping data symbols sent to a message recipient by different message senders. The message received by the message recipient from two different message senders, at a specific instance of time, can be represented by the following formula: $r^i = d^0_i h_0^i + d^1_i h_1^i + n^i$, where $r^i$ is the received symbol at the i-th subcarrier; $d_0^i$ is the transmitted (data or pilot) symbol at the i-th subcarrier from a first message sender 102 to the message recipient 104; $d_1^i$ is the transmitted (data or pilot) symbol at the i-th subcarrier from a second message sender 106 to the message recipient 104; "*" represents a convolution operation, $h_0^i$ is the channel response at the i-th subcarrier between the first message sender 102 and the message recipient 104; $h_1^i$ is the channel response at the i-th subcarrier between the second message sender 106 and the message recipient 104; and $n_i$ is the noise at the i-th subcarrier.

The impulse response $h_0^i$ for the communication channel between the first message sender and the message recipient, the impulse response $h_1^i$ for the communication channel between the second message sender and the message recipient, and noise ($n^i$) should be accounted for in the solution. The overlapping message decoder 118 assumes noise is an additive Gaussian random process and that the signal level is sufficiently for detection (e.g., the signal level is not 'noise limited'). The noise, therefore, is not considered a major factor in decoding the message.

The overlapping message decoder 118 is configured to estimate the values of the data symbols $d_0^i$ transmitted by the first message sender to the message recipient and the data symbols $d_1^i$ transmitted by the second message sender to the message recipient. The overlapping message decoder 118 is configured to perform, in two phases, the analysis of $r^i = d_0^i h_0^i + d_1^i h_1^i$, to determine $d_0^i$ and $d_1^i$. In a first phase, the overlapping message decoder 118 uses a known value for $h_0$ and estimates $d_0^i$ and $h_1^i$. The known value for $h_0$ may be determined during the period in which there is no message overlap. In a second phase, the overlapping message decoder 118 uses the known value for $h_0$, uses the estimated value for $h_1^i$ determined in phase 1, and estimates $d_0^i$ and $d_1^i$.

In phase 1 of the analysis of $r^i = d_0^i h_0^i + d_1^i h_1^i$, the overlapping message decoder 118 is configured to estimate $d_0^i$ and $h_1^i$ given that $d_0^i$ has a predefined constellation, assuming that $h_1^i$ can be modeled as a stationary random process, and that the changes of $h_1^i$ is kept minimal. If the message containing $d_0$ was the first received message, then $h_0$ may be assumed as the impulse response determined using conventional impulse response determination techniques, e.g., in connection with a pilot signal. The overlapping message decoder 118 may use maximum-likelihood decoding to estimate $d_0^i$ and $h_1^i$. Given a received codeword r, maximum likelihood decoding picks a codeword $d_0^i$ that maximizes that maximizes the probability that r was received, given that $d_0^i$ was sent.

In an example use of maximum-likelihood decoding with QPSK, maximum-likelihood decoding could result in solving:

$$p_{m,n}^{i+1} = \left| \frac{r^{(i+1)} - \hat{d}_0^{(i+1)} h_0^{(i+1)}}{s_m} - \frac{r^i - \hat{d}_0^{(i)} h_0^{(i)}}{s_n} \right|, m \text{ and } n \in \{0, 1, 2, 3\}.$$

In phase 2 of the analysis of $r^i = d_0^i h_0^i + d_1^i h_1^i$, the overlapping message decoder 118 is configured to estimate $d_0^i$ and $d_1^i$ using $h_1^i$ determined from phase 1 and given that $d_0^i$ and $d_1^i$ have predefined constellations. $h_0$, again, may be assumed as the impulse response determined using conventional impulse response determination techniques, e.g., in connection with a pilot signal. The overlapping message decoder 118 may use any of a number of known techniques for determining $d_0^i$ and $d_1^i$ from $$r^i = d_0^i h_0^i + d_1^i h_1^i + n^i$$

such as maximum-likelihood (ML), least squares (LS), minimum mean squared error (MMSE) etc.

Figure 3:
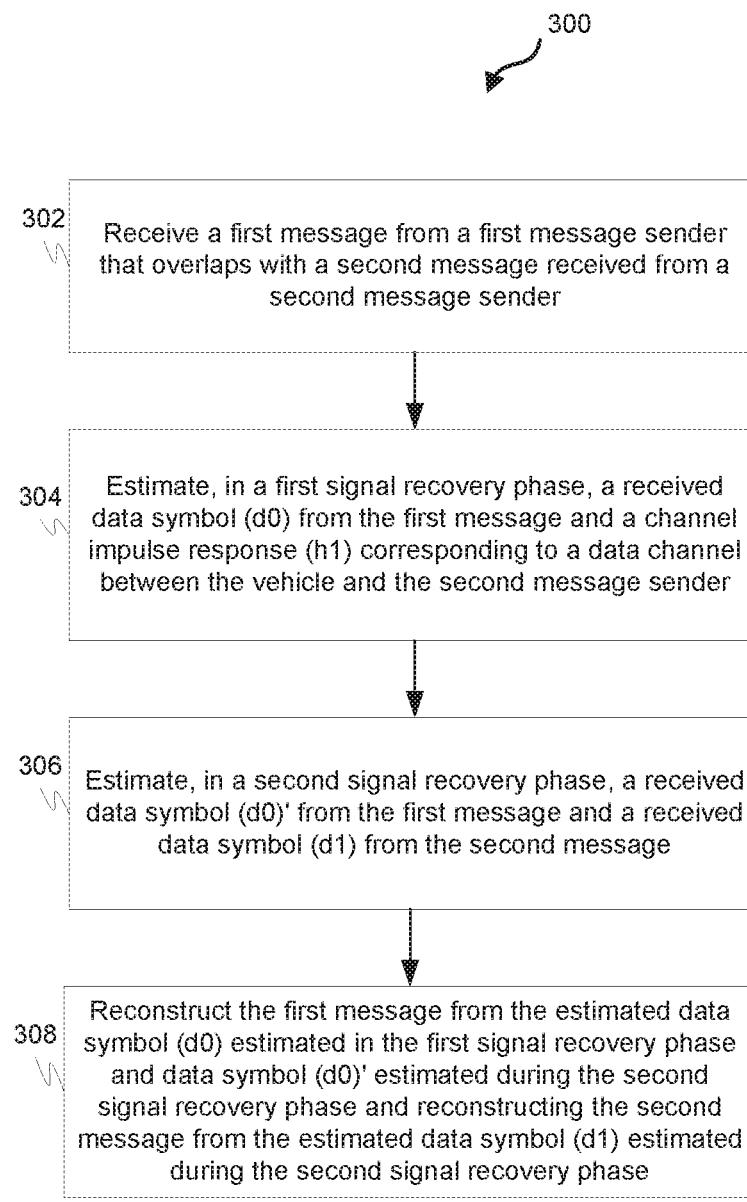
FIG. 3 is a process flow chart depicting an example process in a vehicle or on a mobile device for decoding overlapping wireless messages, in accordance with some embodiments.

FIG. 3 is a process flow chart depicting an example process 300 in a vehicle or on a mobile device for decoding overlapping wireless messages. The example process 300 may be performed by a controller 34 in the vehicle that implements an overlapping message decoder 118. The example process 300 includes receiving a first message from a first message sender that overlaps with a second message received from a second message sender (operation 302).

The example process 300 includes estimating, in a first signal recovery phase, a received data symbol ($d_0$) from the first message and a channel impulse response ($h_1$) corresponding to a data channel between the vehicle and the second message sender (operation 304). The estimating, in a first signal recovery phase, a received data symbol ($d_0$) from the first message and a channel impulse response ($h_1$) corresponding to the data channel between the vehicle and the second message sender may comprise using maximum-likelihood decoding to estimate, in a first signal recovery phase, a received data symbol ($d_0$) from the first message and a channel impulse response ($h_1$) corresponding to the data channel between the vehicle and the second message sender. The estimating in the first signal recovery phase may comprise assuming the changes of channel impulse response ($h_1$) in both time-domain and frequency-domain as being minimal, and includes estimating a received data symbol ($d_0$) and a channel impulse response ($h_1$) simultaneously with this assumption.

The example process 300 includes estimating, in a second signal recovery phase, a received data symbol ($d_0$)' from the first message and a received data symbol ($d_1$) from the second message (operation 306). The estimating in the second signal recovery phase may comprise using the estimated value for the channel impulse response ($h_1$) corresponding to a data channel between the vehicle and the second message sender determined in the first signal recovery phase and estimating a received data symbol ($d_0$)' from the first message and a received data symbol ($d_1$) from the second message. The estimating in the second signal recovery phase may comprise assuming a value for a channel impulse response ($h_0$) corresponding to a data channel between the vehicle and the first message sender, using the estimated value for the channel impulse response ($h_1$) corresponding to a data channel between the vehicle and the second message sender determined in the first signal recovery phase and estimating a received data symbol ($d_0$)' from the first message and a received data symbol ($d_1$) from the second message.

The example process 300 includes reconstructing the first message from the estimated data symbol ($d_0$) estimated in the first signal recovery phase and data symbol ($d_0$)' estimated during the second signal recovery phase and reconstructing the second message from the estimated data symbol ($d_1$) estimated during the second signal recovery phase (operation 308).

The described systems, methods, apparatus, and techniques can provide a novel method to align two overlapped, consecutive OFDM packets from different sources, and separate them by predefined estimation to reduce on-board processing burden. The described systems, methods, apparatus, and techniques can provide a system and method for decoding two overlapping frames in a distributed wireless networks (e.g., LTE, 5G, DVB, WiFi, C-V2X, etc.) with very low computational complexity. The described systems, methods, apparatus, and techniques can provide improved PER performance and higher network throughput. The described systems, methods, apparatus, and techniques are applicable for many distributed wireless networks (e.g., C-V2X, LTE, 5G, DVB, and WiFi).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A processor-implemented method by a message recipient in a vehicle or on a mobile device for decoding overlapping wireless messages, the method comprising:
receiving a first message from a first message sender that overlaps with a second message received from a second message sender;
estimating, in a first signal recovery phase, a received data symbol ($d_0$) from the first message and a channel impulse response ($h_1$) corresponding to a data channel between the message recipient and the second message sender;
estimating, in a second signal recovery phase, a received data symbol ($d_0$)' from the first message and a received data symbol ($d_1$) from the second message; and
reconstructing the first message from the received data symbol ($d_0$) estimated in the first signal recovery phase and the received data symbol ($d_0$)' estimated during the second signal recovery phase and reconstructing the second message from the received data symbol ($d_1$) estimated during the second signal recovery phase.

2. The method of claim 1, wherein the estimating, in the first signal recovery phase, the received data symbol ($d_0$) from the first message and the channel impulse response ($h_1$) corresponding to the data channel between the message recipient and the second message sender comprises using maximum-likelihood decoding to estimate, in the first signal recovery phase, the received data symbol ($d_0$) from the first message and the channel impulse response ($h_1$) corresponding to the data channel between the message recipient and the second message sender.

3. The method of claim 1, wherein the estimating in the first signal recovery phase comprises assuming the changes of the channel impulse response ($h_1$) in both time-domain and frequency-domain as being minimal, and includes estimating the received data symbol ($d_0$) and the channel impulse response ($h_1$) simultaneously with this assumption.

4. The method of claim 1, wherein the estimating in the second signal recovery phase comprises using an estimated value for the channel impulse response ($h_1$) corresponding to the data channel between the message recipient and the second message sender determined in the first signal recovery phase and estimating the received data symbol ($d_0$)' from the first message and the received data symbol ($d_1$) from the second message.

5. The method of claim 4, wherein the estimating in the second signal recovery phase comprises assuming a value for the channel impulse response ($h_0$) corresponding to the data channel between the message recipient and the first message sender, using the estimated value for the channel impulse response ($h_1$) corresponding to a data channel between the message recipient and the second message sender determined in the first signal recovery phase and estimating the received data symbol ($d_0$)' from the first message and the received data symbol ($d_1$) from the second message.

6. The method of claim 1, wherein the estimating in the first signal recovery phase and the estimating in the second signal recovery phase are performed by a controller configured by programming instructions on non-transitory computer readable media at the message recipient.

7. A controller for a message recipient in a vehicle or on a mobile device for decoding overlapping wireless messages, the controller configured to:
receive a first message from a first message sender that overlaps with a second message received from a second message sender;
estimate, in a first signal recovery phase, a received data symbol ($d_0$) from the first message and a channel impulse response ($h_1$) corresponding to a data channel between the message recipient and the second message sender;
estimate, in a second signal recovery phase, a received data symbol ($d_0$)' from the first message and a received data symbol ($d_1$) from the second message; and
reconstruct the first message from the received data symbol ($d_0$) estimated in the first signal recovery phase and the received data symbol ($d_0$)' estimated during the second signal recovery phase and reconstruct the second message from the received data symbol ($d_1$) estimated during the second signal recovery phase.

8. The controller of claim 7, wherein to estimate, in the first signal recovery phase, the received data symbol ($d_0$) from the first message and the channel impulse response ($h_1$) corresponding to the data channel between the message recipient and the second message sender, the controller is configured to implement maximum-likelihood decoding to estimate, in the first signal recovery phase, the received data symbol ($d_0$) from the first message and the channel impulse response ($h_1$) corresponding to the data channel between the message recipient and the second message sender.

9. The controller of claim 7, wherein to estimate, in a first signal recovery phase, the controller is configured to assume the changes of the channel impulse response ($h_1$) in both time-domain and frequency-domain are minimal and estimate the received data symbol ($d_0$) and the channel impulse response ($h_1$) simultaneously with this assumption.

10. The controller of claim 7, wherein to estimate in the second signal recovery phase the controller is configured to use an estimated value for the channel impulse response ($h_1$) corresponding to the data channel between the message recipient and the second message sender determined in the first signal recovery phase and estimate the received data symbol ($d_0$)' from the first message and the received data symbol ($d_1$) from the second message.

11. The controller of claim 10, wherein to estimate in the second signal recovery phase the controller is configured to use a known value for the channel impulse response ($h_0$) corresponding to the data channel between the message recipient and the first message sender, use the estimated value for the channel impulse response ($h_1$) corresponding to the data channel between the message recipient and the second message sender determined in the first signal recovery phase and estimate the received data symbol ($d_0$)' from the first message and the received data symbol ($d_1$) from the second message.

12. A non-transitory computer readable storage medium embodying programming instruction for performing a method by a message recipient in a vehicle or on a mobile device, the method comprising:

receiving a first message from a first message sender that overlaps with a second message received from a second message sender;

estimating, in a first signal recovery phase, a received data symbol ($d_0$) from the first message and a channel impulse response ($h_1$) corresponding to a data channel between the message recipient and the second message sender;

estimating, in a second signal recovery phase, the received data symbol ($d_0$)' from the first message and a received data symbol ($d_1$) from the second message; and reconstructing the first message from the received data symbol ($d_0$) estimated in the first signal recovery phase and the received data symbol ($d_0$)' estimated during the second signal recovery phase and reconstructing the second message from the received data symbol ($d_1$) estimated during the second signal recovery phase.

13. The non-transitory computer readable storage medium of claim 12, wherein the estimating, in the first signal recovery phase, the received data symbol ($d_0$) from the first message and the channel impulse response ($h_1$) corresponding to the data channel between the message recipient and the second message sender comprises using maximum-likelihood decoding to estimate, in the first signal recovery phase, the received data symbol ($d_0$) from the first message and the channel impulse response ($h_1$) corresponding to the data channel between the message recipient and the second message sender.

14. The non-transitory computer readable storage medium of claim 12, wherein the estimating in the first signal recovery phase comprises using a known value for the channel impulse response ($h_0$) corresponding to the data channel between the message recipient and the first message sender and estimating the received data symbol ($d_0$) from the first message and the channel impulse response ($h_1$) corresponding to the data channel between the message recipient and the second message sender.

15. The non-transitory computer readable storage medium of claim 12, wherein the estimating in the second signal recovery phase comprises using an estimated value for the channel impulse response ($h_1$) corresponding to the data channel between the message recipient and the second message sender determined in the first signal recovery phase and estimating the received data symbol ($d_0$)' from the first message and the received data symbol ($d_1$) from the second message.

16. The non-transitory computer readable storage medium of claim 15, wherein the estimating in the second signal recovery phase comprises using a known value for the channel impulse response ($h_0$) corresponding to the data channel between the message recipient and the first message sender, using an estimated value for the channel impulse response ($h_1$) corresponding to the data channel between the message recipient and the second message sender determined in the first signal recovery phase and estimating the received data symbol ($d_0$)' from the first message and the received data symbol ($d_1$) from the second message.

17. The non-transitory computer readable storage medium of claim 12, wherein the estimating in the first signal recovery phase and the estimating in the second signal recovery phase are performed by a controller configured by programming instructions on non-transitory computer readable media at the message recipient.

\* \* \* \* \*